US006973405B1

(12) United States Patent
Ansari (10) Patent No.: US 6,973,405 B1
(45) Date of Patent: Dec. 6, 2005

(54) PROGRAMMABLE INTERACTIVE VERIFICATION AGENT

(75) Inventor: Ahmad R. Ansari, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 95 days.

(21) Appl. No.: 10/153,980

(22) Filed: May 22, 2002

(51) Int. Cl.[7] .......................................... G06F 11/277
(52) U.S. Cl. .................... 702/117; 702/119; 702/123; 714/724; 714/725
(58) Field of Search ........................... 702/117, 58, 59, 702/118, 119, 120, 122–124, 126, 185, 186, 702/189, FOR 103, FOR 104, FOR 134, 702/FOR 135, FOR 170, FOR 171; 714/718, 714/719, 728, 723–725, 730, 732–734, 743, 714/30–33, 42, 736–738, 745; 703/14, 15; 712/4; 711/100, 5; 365/201; 326/37–39, 326/41; 324/765, 73.1; 716/4, 5, 16

(56) References Cited

U.S. PATENT DOCUMENTS

| | | | |
|---|---|---|---|
| 4,758,985 A | 7/1988 | Carter | 365/44 |
| 4,855,669 A | 8/1989 | Mahoney | 324/73.1 |
| 5,072,418 A | 12/1991 | Boutaud et al. | 708/207 |
| 5,142,625 A | 8/1992 | Nakai | 395/275 |
| RE34,363 E | 8/1993 | Freeman | 307/465 |
| 5,274,570 A | 12/1993 | Izumi et al. | 716/1 |
| 5,311,114 A | 5/1994 | Sambamurthy et al. | 370/296 |
| 5,339,262 A | 8/1994 | Rostoker et al. | 716/4 |
| 5,347,181 A | 9/1994 | Ashby et al. | 326/39 |
| 5,361,373 A | 11/1994 | Gilson | 712/1 |
| 5,457,410 A | 10/1995 | Ting | 326/41 |
| 5,473,267 A | 12/1995 | Stansfield | 326/91 |
| 5,500,943 A | 3/1996 | Ho et al. | 712/218 |
| 5,504,738 A | 4/1996 | Sambamurthy et al. | 370/296 |
| 5,537,601 A | 7/1996 | Kimura et al. | 712/35 |
| 5,543,640 A | 8/1996 | Sutherland et al. | 257/202 |
| 5,550,782 A | 8/1996 | Cliff et al. | 365/230.05 |
| 5,552,722 A | 9/1996 | Kean | 326/41 |
| 5,574,930 A | 11/1996 | Halverson, Jr. et al. | 712/34 |
| 5,574,942 A | 11/1996 | Colwell et al. | 712/23 |
| 5,581,745 A | 12/1996 | Muraoka et al. | 713/502 |
| 5,600,845 A | 2/1997 | Gilson | 712/39 |
| 5,652,904 A | 7/1997 | Trimberger | 712/38 |
| 5,671,355 A | 9/1997 | Collins | 709/250 |
| 5,705,938 A | 1/1998 | Kean | 326/39 |

(Continued)

FOREIGN PATENT DOCUMENTS

EP         0315275 A2    10/1989

(Continued)

OTHER PUBLICATIONS

Sayfe Kiaei et al., "VLSI Design of Dynamically Reconfigurable Array Processor-DRAP," IEEE, Feb. 1989, pp. 2484-2486, 2488, V3.6, IEEE, 3 Park Avenue, 17th Floor, New York, NY 10016-5997.

(Continued)

Primary Examiner—Hal Wachsman
(74) Attorney, Agent, or Firm—H. C. Chan; Kim Kanzaki; LeRoy D. Maunu (57) ABSTRACT

A verification agent can be used to verify hard and/or soft modules under test in an integrated circuit. The integrated circuit contains a processor and memory for storing code executable by the processor. The module under test performs predetermined operations. The verification agent interacts with the module under test, including sending signals to the module under test and generating results based on the interaction. The code causes the processor to receive the results and compare the results with expected values. The module under test may be deemed to operate properly if the actual results match the expected values.

27 Claims, 8 Drawing Sheets

U.S. PATENT DOCUMENTS

| | | | | |
|---|---|---|---|---|
| 5,732,250 | A | 3/1998 | Bates et al. | 713/600 |
| 5,737,631 | A | 4/1998 | Trimberger | 712/37 |
| 5,740,404 | A | 4/1998 | Baji | 711/167 |
| 5,742,179 | A | 4/1998 | Sasaki | 326/39 |
| 5,742,180 | A | 4/1998 | DeHon et al. | 326/40 |
| 5,748,979 | A | 5/1998 | Trimberger | 712/37 |
| 5,752,035 | A | 5/1998 | Trimberger | 717/153 |
| 5,760,607 | A | 6/1998 | Leeds et al. | 326/38 |
| 5,809,517 | A | 9/1998 | Shimura | 711/115 |
| 5,835,405 | A | 11/1998 | Tsui et al. | 365/182 |
| 5,874,834 | A | 2/1999 | New | 326/39 |
| 5,889,788 | A | 3/1999 | Pressly et al. | 714/726 |
| 5,892,961 | A | 4/1999 | Trimberger | 712/10 |
| 5,914,616 | A | 6/1999 | Young et al. | 326/41 |
| 5,914,902 | A | 6/1999 | Lawrence et al. | 365/201 |
| 5,933,023 | A | 8/1999 | Young | 326/30 |
| 5,970,254 | A | 10/1999 | Cooke et al. | 712/37 |
| 6,011,407 | A | 1/2000 | New | 326/39 |
| 6,020,755 | A | 2/2000 | Andrews et al. | 326/39 |
| 6,026,481 | A | 2/2000 | New et al. | 712/43 |
| 6,096,091 | A | 8/2000 | Hartmann | 716/17 |
| 6,108,806 | A * | 8/2000 | Abramovici et al. | 714/725 |
| 6,154,051 | A | 11/2000 | Nguyen et al. | 326/41 |
| 6,163,166 | A | 12/2000 | Bielby et al. | 326/38 |
| 6,172,990 | B1 | 1/2001 | Deb et al. | 370/474 |
| 6,178,533 | B1 * | 1/2001 | Chang | 714/739 |
| 6,178,541 | B1 | 1/2001 | Joly et al. | 716/17 |
| 6,181,163 | B1 | 1/2001 | Agrawal et al. | 326/41 |
| 6,211,697 | B1 | 4/2001 | Lien et al. | 326/41 |
| 6,247,151 | B1 * | 6/2001 | Poisner | 714/718 |
| 6,272,451 | B1 | 8/2001 | Mason et al. | 703/13 |
| 6,272,588 | B1 * | 8/2001 | Johnston et al. | 711/106 |
| 6,279,045 | B1 | 8/2001 | Muthujumaraswathy et al. | 710/5 |
| 6,282,627 | B1 | 8/2001 | Wong et al. | 712/15 |
| 6,301,696 | B1 | 10/2001 | Lien et al. | 716/16 |
| 6,343,207 | B1 | 1/2002 | Hessel et al. | 455/86 |
| 6,356,987 | B1 | 3/2002 | Aulas | 711/167 |
| 6,389,558 | B1 | 5/2002 | Herrmann et al. | 714/39 |
| 6,412,046 | B1 * | 6/2002 | Sharma et al. | 711/137 |
| 6,467,009 | B1 | 10/2002 | Winegarden et al. | 710/305 |
| 6,483,342 | B2 | 11/2002 | Britton et al. | 326/39 |
| 6,578,174 | B2 | 6/2003 | Zizzo | 716/1 |
| 6,604,228 | B1 | 8/2003 | Patel et al. | 716/8 |
| 6,615,167 | B1 * | 9/2003 | Devins et al. | 703/28 |
| 2001/0049813 | A1 | 12/2001 | Chan et al. | 716/8 |
| 2003/0009712 | A1 * | 1/2003 | Lukanc | 714/718 |

FOREIGN PATENT DOCUMENTS

| | | |
|---|---|---|
| EP | 0 905 906 A2 | 3/1999 |
| EP | 1 235 351 A1 | 8/2002 |
| WO | WO 93 25968 A1 | 12/1993 |

OTHER PUBLICATIONS

Vason P. Srini, "Field Programmable Gate Array (FPGA) Implementation of Digital Systems: An Alternative to ASIC," IEEE, May 1991, pp. 309-311, 313, IEEE, 3 Park Avenue, 17th Floor, New York, NY 10016-5997.

G. Maki et al., "A Reconfigurable Data Path Processor," IEEE, Aug. 1991, pp. 18-4.1 and 18-4.3 IEEE, 3 Park Avenue, 17th Floor, New York, NY 10016-5997.

Jacob Davidson, "FPGA Implementation of Reconfigurable Microprocessor," IEEE, Mar. 1993, pp. 3.2.1-3.2.3 IEEE, 3 Park Avenue, 17th Floor, New York, NY 10016-5997.

Christian Iseli et al. "Beyond Superscaler Using FPGA's," IEEE, Apr. 1993, pp. 486-488, 490, IEEE, 3 Park Avenue, 17th floor, New York, NY 10016-5997.

P.C. French et al., "A Self-Reconfiguring Processor,"; IEEE, Jul. 1993, pp. 50-59, IEEE, 3 Park Avenue, 17th Floor, New York, NY 10016-5997.

Christian Iseli et al., "Spyder: A Reconfigurable VLIW Processor Using FPGA's," IEEE, Jul. 1993, pp. 17-24, IEEE, 3 Park Avenue, 17th Floor, New York, NY 10016-5997.

Michael I. Wirthlin et al., "The Nano Processor: A Low Resource Reconfigurable Processor," IEEE, Feb. 1994, pp. 23-30, IEEE, 3 Park Avenue, 17th Floor, New York, NY 10016-5997.

William S. Carter "The Future of Programmable Logic and Its Impact on Digital System Design," Apr. 1994, IEEE, pp. 10-16, IEEE, 3 Park Avenue, 17th Floor, New York, NY 10016-5997.

Andre' Dehon, "DPGA-Coupled Microprocessor: Commodity ICs for the Early 21st Century," IEEE, Feb. 1994, pp. 31-39, IEEE, 3 Park Avenue, 17th Floor, New York, NY 10016-5997.

Osama T. Albaharna, "Area & Time Limitations of FPGA-Based Virtual Hardware," IEEE, Apr. 1994, pp. 184-185, 186, 187, 188, 189, IEEE, 3 Park Avenue, 17th Floor, New York, NY 10016-5997.

*Xilinx, Inc.*, "The Programmable Logic Data Book," 1994, Revised 1995, Xilinx, Inc., 2100 Logic Drive, San Jose, CA. 95124, 17 pages.

*Xilinx, Inc.*, "The Prgrammable Logic Data Book," 1994, revised 1995, pp 2-109 to 2-117, Xilinx, Inc., 2100 Logic Drive, San Jose, CA. 95124.

*Xilinx, Inc.*, "The Programmable Logic Data Book," 1994, Revised 1995, pp 2-9 to 2-18; 2-187 to 2-199, Xilinx Inc., 2100 Logic Drive, San Jose, CA. 95124.

*Xilinx, Inc.* "The Programmable Logic Data Book," 1994, Revised 1995, pp 2-107 to 2-108, Xilinx, Inc., 2100 Logic Drive, San Jose, CA. 95124.

Christian Iseli et al., "AC++ Compiler For FPGA Custom Execution Units Synthesis," 1995, pp. 179-179, IEEE, 3 PARK Avenue, 17th Floor, New York, NY 10016-5997.

*International Business Machines* "POWERPC 405 Embedded Processor Core User Manual," 1996, 5TH Ed., pp. 1-1 TO X-16, International Business Machines, 1580 rout 52, Bldg. 504 Hopewell Junction, NY 12533-6531, no month.

Yamin Li et al., "AIZUP-A Pipelined Processor Design & Implementation on Xilinx FPGA Chip," IEEE, Sep. 1996, pp 98-106, 98-106, IEEE, 3 Park Avenue, 17th Floor New York, NY 10016-5997.

Ralph D. Wittig et al., ONECHIP: An FPGA Processor With Reconfigurable Logic, Apr 17, 1996, pp 126-135, IEEE, 3 Park Avenue, 17th Floor, New York, NY 10016-5997.

*Xilinx, Inc.*, "The Programmable Logic Data Book," Jan. 27, 1999, Ch. 3, pp 3-1 TO 3-50, Xilinx, Inc., 2100 Logic Drive, San Jose, CA 95124.

William B. Andrew et al., "A Field Programmable System Chip Which Combines FPGA & ASIC Circuitry," IEEE, May 16, 1999, pp. 183-186, IEEE, 3 Park Avenue, 17th Floor, New York, NY 10016-5997.

*Xilinx Inc.*, "The Programmable Logic Data Book," 2000, Ch. 3 pp 3-1 TO 3-117, Xilinx, Inc., 2100 Logic Drive, San Jose, CA 95124, no month.

*Xilinx, Inc.*, "The Programmable Logic Data Book," 2000, Ch 3, pp 3-7 TO 3-17; 3-76 TO 3-87, Xilinx, Inc., 2100 Logic Drive, San Jose, CA. 95124.

*International Business Machines,* "Processor Local Bus"Architecture Specifications, 32-Bit Implementation, Apr. 2000, First Edition, V2.9, pp. 1-76, IBM Corporation, Department H83A, P.O. Box 12195, Research Triangle Park, NC 27709.

*Xilinx, Inc.,* Virtex II Platform FPGA Handbook, Dec. 6, 2000, v1.1, pp 33-75, Xilinx, Inc., 2100 Logic Drive, San Jose, CA. 95124.

Cary D. Snyder et al., "Xilinx'S A-TO-Z System Platform," Cahners Microprocessor Report, Feb. 26, 2001, pp 1-5, Microdesign Resources, www.MDRonline.com, 408-328-3900.

U.S. Appl. No. 09/968,446, filed Sep. 28, 2001, Douglass et al.
U.S. Appl. No. 09/991,410, filed Nov. 16, 2001, Herron et al.
U.S. Appl. No. 09/991,412, filed Nov. 16, 2001, Herron et al.
U.S. Appl. No. 10/001,871, filed Nov. 19, 2001, Douglass et al.
U.S. Appl. No. 10/043,769, filed Jan. 9, 2002, Schulz.

* cited by examiner

PROGRAMMABLE INTERACTIVE VERIFICATION AGENT

FIELD OF THE INVENTION

The present invention relates to system on a chip (SoC), and more particularly to verification of components in the SoC.

BACKGROUND OF THE INVENTION

The number of transistors that can be fabricated on a semiconductor has increased drastically over the years. It is now possible to implement a whole system (containing processor, memory and logic) on an integrated circuit, i.e., SoC. As the complexity of integrated circuits increases, it becomes more and more difficult to properly test them. This problem is especially challenging for field programmable gate arrays (FPGAs) that have embedded fixed processors. A FPGA contains a large number of wires and configuration memory cells, in addition to regular structures such as random access memory (RAM) and logic elements (such as look-up-tables). A user can program the FPGA to implement a variety of circuits. The flexibility and complexity of FPGA means that it is important to have thorough testing.

An important method for testing is by applying a stream of test vectors to the integrated circuit. A test vector is a pattern of signal values, some of which are applied to the integrated circuit and others represent an expected response from the integrated circuit. These vectors are typically applied to the periphery of the integrated circuit sequentially so that they are associated with a proper operational sequence of the internal circuitry of the integrated circuit. This stream of vectors must be created and stored prior to testing.

One problem of this approach is that it needs tremendous amount of physical resource and is very slow. The number of test vectors needed to test an integrated circuit increases drastically with the complexity of the integrated circuit. The test vectors need to be stored and then applied sequentially to the integrated circuit. A large number of test vectors requires lots of memory to store them and a long time to completely apply them to the integrated circuit. As a result, it is very inefficient.

Another problem is that this approach does not lead to a consistent implementation across various stages of designs. System verification is usually done at three levels: RTL, gate-level and on the actual silicon. Traditionally a Verilog or VHDL system testbench is developed to perform the RTL-level verification. Next, the module under test is converted to the gate-level and inserted in the same testbench to perform the gate-level verification. In the ASIC world (as an example) the values at the boundary of the integrated circuit are sampled at this level to create a collection of test vectors. When the integrated circuit is manufactured, the vectors are applied to the integrated circuit on a tester and the outputs are compared with the expected values captured during the simulation.

Having these distinct methods of verification before and after silicon usually causes a variety of problems and limitations. First of all, due to lack of accurate timing during simulations, the captured patterns may not completely match with the actual silicon and there may be unnecessary mismatches during silicon verification. Second, vector-based verification is not useful for timing verification or the performance measurement of the silicon.

Furthermore, conventional simulation testbenches contain structures which are not implementable and therefore the RTL or gate-level testbench cannot be easily ported to the silicon-level verification. Examples of these structures are the ways system level signals (such as clocks) or asynchronous events (such as resets, interrupts, and communication ports) are simulated. In conventional systems, generation of these events is hard coded in the testbench at the behavioral level. For example, the testbench can be designed to release reset input to the system after certain nano-seconds are elapsed. Although, the mechanism can become slightly more flexible by reading the parameters through a script or input file, overall, this approach is only useful for verification during simulation and not on the actual hardware.

The main reason that conventional systems use the vector-based approach is the lack of any other alternatives. Therefore, it would be greatly advantageous if new approaches are developed so that the testbenches used in all three levels of verification are substantially identical. This would also make the maintenance of this testbench much easier.

SUMMARY OF THE INVENTION

The present invention relates to a verification agent that can be used to verify at least one module under test in an integrated circuit, in particularly a FPGA. The integrated circuit contains a processor and memory for storing code executable by the processor. The module under test performs predetermined operations. The verification agent interacts with the module under test, including sending stimuli to the module under test and generating results based on the interaction. The code causes the processor to initiate the verification agent, receive the results, and compare the results with expected values. The module under test may be deemed to operate properly if the actual results match the expected responses. In a different embodiment, the verification agent can be initiated during configuration of the integrated circuit, and later triggers the processor to execute the code.

The above summary of the present invention is not intended to describe each disclosed embodiment of the present invention. The figures and detailed description that follow provide additional example embodiments and aspects of the present invention.

DETAILED DESCRIPTION OF THE INVENTION

The present invention relates to a new verification system. In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

Figure 1:
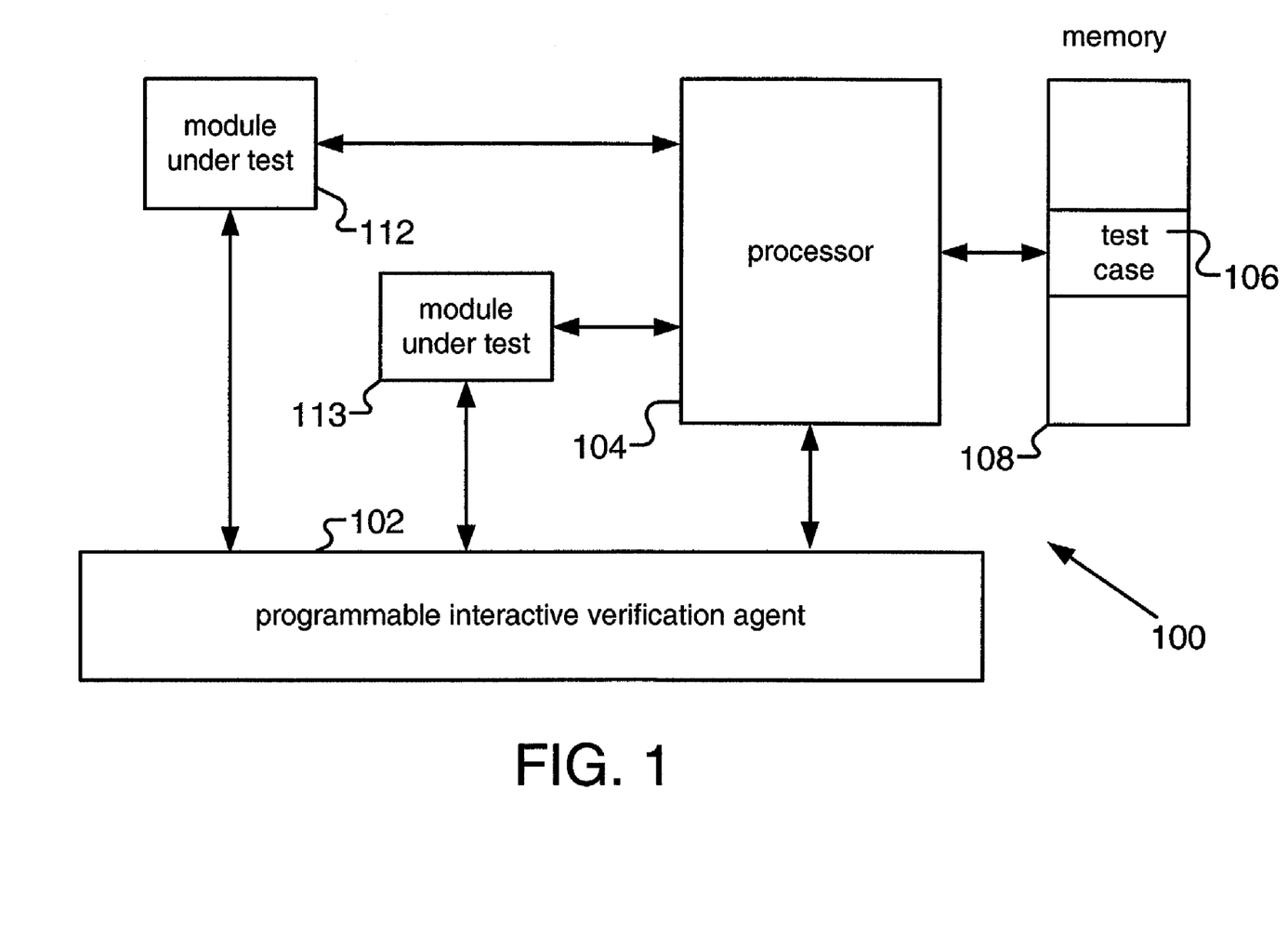
FIG. 1 is a block diagram of an integrated circuit containing a programmable interactive verification agent of the present invention.

FIG. 1 is a block diagram of an integrated circuit 100 containing a programmable interactive verification agent 102 of the present invention. Integrated circuit 100 contains a processor 104 that is preferably hard (i.e., non-programmable). Integrated circuit 100 also contains memory 106 and at least one module under test (two modules, 112 and 113, are shown in FIG. 1). Verification agent 102, memory 106 and modules under test 112-113 are preferably implemented on programmable logic. Examples of modules under test are various intellectual property (IP) cores. These cores are intended to be used by many parties in many circuit environments. Modules under test may be hard or soft (i.e., programmable) modules.

In integrated circuit 100, the modules under test can preferably communicate with processor 104. Verification agent 102 communicates with processor 104 and the modules under test 112-113. Processor 104 executes program code stored in memory 106, including program code 108 for a test case that is related to the operation of verification agent 102 and the modules under test.

Figure 2:
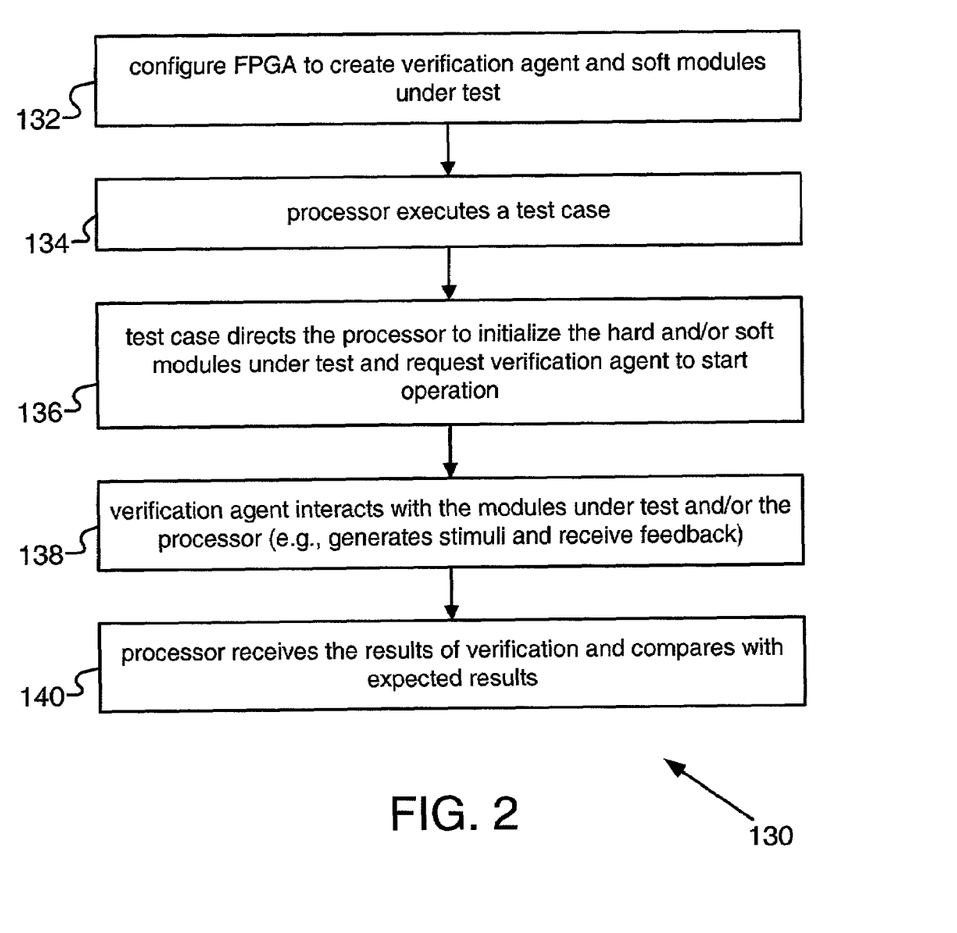
FIG. 2 is flow chart showing an operation of the components in the integrated circuit of FIG. 1 in accordance with the present invention.

FIG. 2 is a flow chart showing the operation 130 of the components in integrated circuit 100 in accordance with the present invention. In this flow chart, it is assumed that integrated circuit is an FPGA having an embedded processor. In step 132, the FPGA is configured to create the soft modules under test and the verification agent. In step 134, the processor executes the test case. The test case preferably causes the processor to initialize the modules under test (which can be hard or soft) and the verification agent (step 136). For example, the processor can set the states of the modules under test to predetermined values. The processor then sends a request to the verification agent causing it to start the verification operations. In step 138, the verification agent can interact with the modules under test and/or the processor. For example, it can send stimuli to the modules under test and receive signals from them. The verification agent can evaluate the signals and send further stimuli to some or all of the modules under test. In step 140, the processor receives results from the modules under test and the verification agent. It then compares the results with expected results and makes determination on whether the verification is successful.

Figure 3:
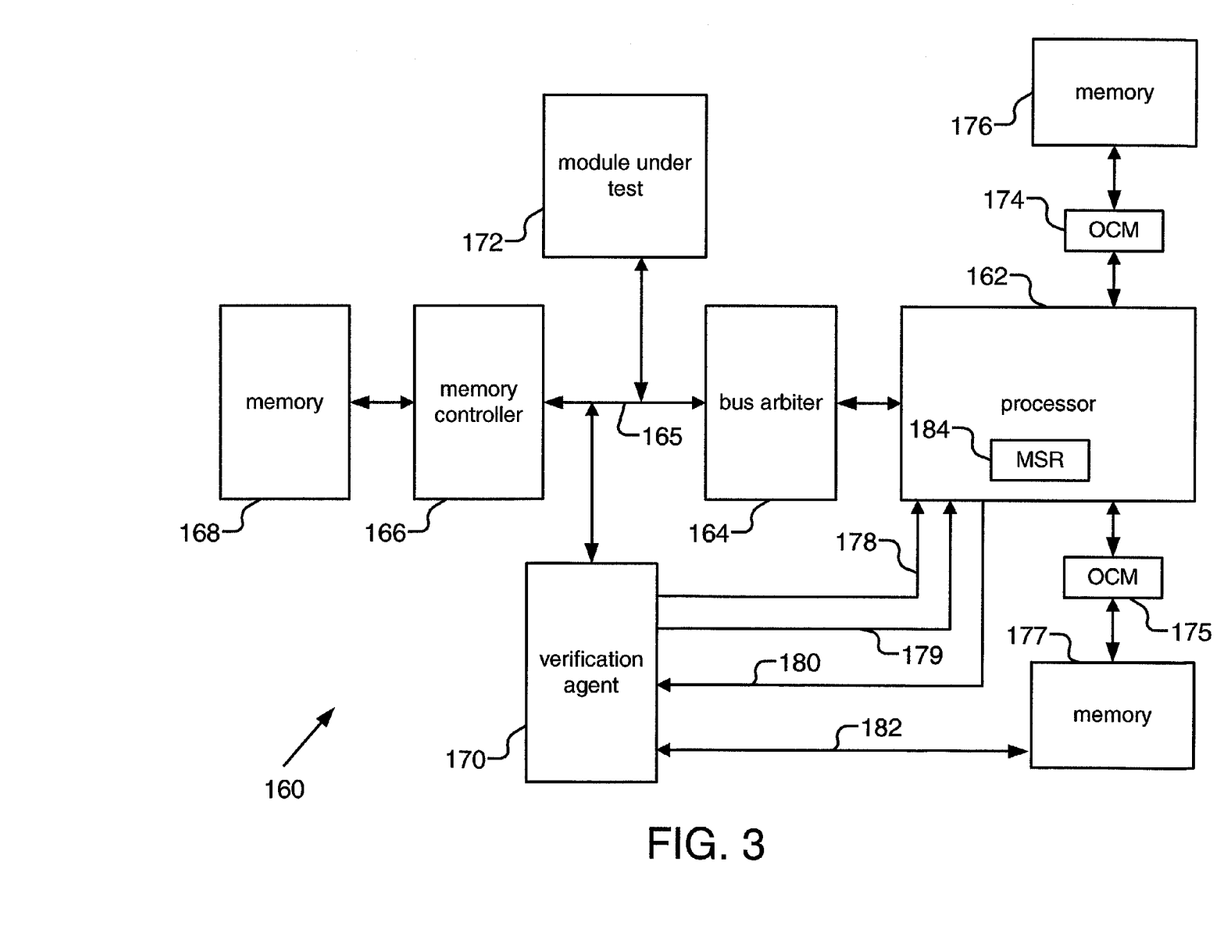
FIG. 3 is a block diagram showing an implementation of a data processing system containing the verification agent of the present invention.

One embodiment of a system 160 that can be implemented in integrated circuit 100 of FIG. 1 is shown in FIG. 3. It comprises a fixed processor 162 connected to a bus arbiter 164. Arbiter 164 manages the operation of a bus 165 that is used by various modules. An example of such a bus is a processor local bus (PLB). One of the modules that are connected to bus 165 is a soft memory controller 166. Memory controller 166 controls the operation of a block of memory 168. In this embodiment, a verification agent 170 is mapped into the address space of processor 162, and is preferably connected to bus 165. A module under test 172 may also be connected to bus 165. Thus, verification agent 170 is able to communicate with processor 162 and module under test 172.

Processor 162 is preferably connected to an on-chip memory controller (OCM), such as OCMs 174 and 175. Each OCM can control its respective memory block, such as memory blocks 176 and 177. Verification agent 170 may communicate with processor 162 directly (i.e., without using bus 165). As an example, verification agent 170 can be configured to receive a notification signal from processor 164 (indicated by a line 180) and deliver an interrupt signal (indicated by a line 178) and clock signals (indicated by a line 179) to processor 164. Note that additional signals may be present. Further, verification agent 170 can also communicate directly with other modules (such as communicating with memory block 177 through a line 182).

Figure 4:
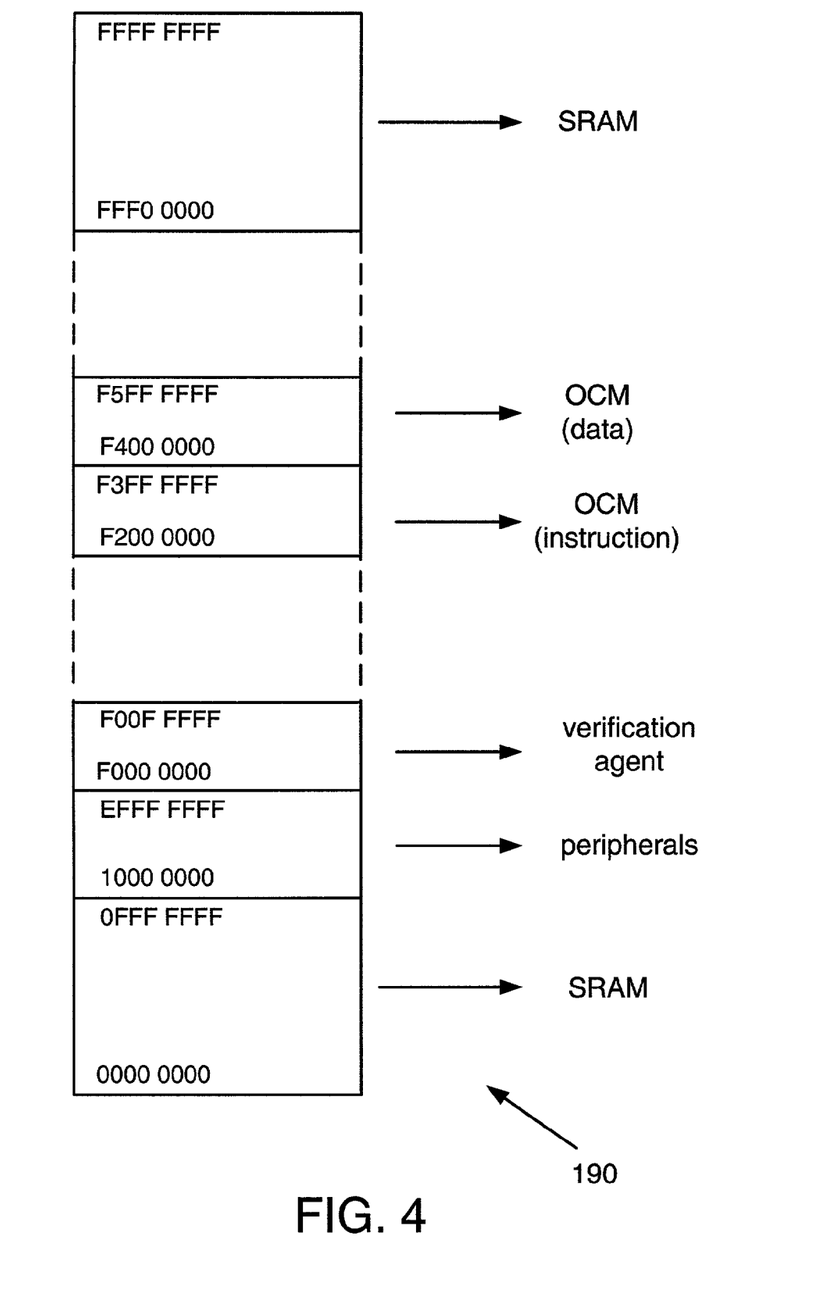
FIG. 4 is a memory map of the data processing system shown in FIG. 3.

FIG. 4 shows an exemplary memory map 190 of system 160. The memory space between 00000000 and FFFFFFFF is divided into many segments. Different kinds of components, such as peripherals, random access memory devices, etc., occupy different segments. In this example, the verification agent occupies the space between F0000000 and F00FFFFF. Thus, the processor can communicate with the verification agent by writing to and reading from this address space.

Figure 5:
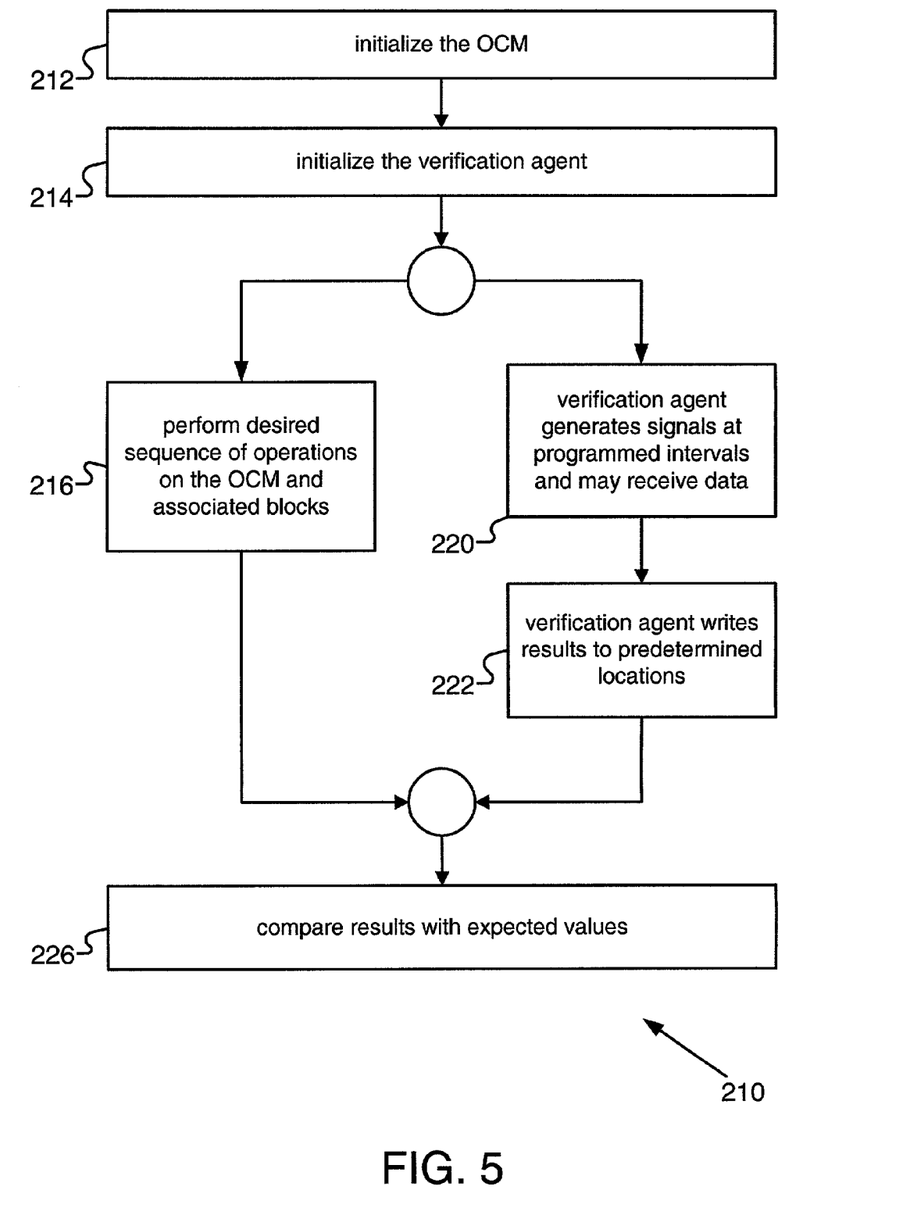
FIG. 5 is a flow chart showing a process of the present invention that can be used to test an on-chip memory controller.

FIG. 5 shows an example of a process 210 of the present invention that tests an OCM. In step 212, the processor initializes the OCM. For example, it may map the OCM controller to a specific region in the memory, disable the processor caches for that region, and set up the translation look-aside buffers with appropriate attributes for that region. In step 214, the processor initializes the verification agent. For example, it may set a counter in the verification agent to a predetermined value. Note that the order of steps 212 and 214 is not important for this example. After these operations, both the OCM and the verification agent can operate concurrently. In step 216, the processor performs a set of operations on the OCM and its associated blocks. For example, the processor may place the OCM in a first mode of operation by writing one value into a register of the OCM and a second mode of operation by writing another value. The processor then reads and writes data into the memory (i.e., an associated block with respect to the OCM). If the OCM is not functioning properly, the processor may not be able to correctly interact with the memory. Turning now to the verification agent, it is programmed to generate various signals at certain intervals (step 220). It may also receive data from the OCM and the memory. The results may be written into predetermined locations (inside or outside of the verification agent) so that the processor can access them (step 222). After the testing is performed, the processor compares the actual results with the expected results (step 226). Based on this comparison, the process can make a determination on whether the OCM is working properly.

An example of applying process 210 to system 160 of FIG. 3 is now described. The test case may cause processor 162 to set itself to a sleep mode (e.g., by writing a predetermined code to a machine state register 184 in processor 162). Processor 162 then sends a notification signal to verification agent 170 through line 180 indicating that it is now ready to be stopped. Verification agent 170 shuts down the clock signals (line 178) connected to processor 162. At this time, processor 162 is in the sleep mode. Verification agent 170 then counts a predetermined number of clock cycles. At the end of the counts, verification agent 170 reapplies the clock signals to processor 162. It also sends an interrupt signal (line 179) to processor 162 to wake it up.

Processor 162 then interacts with OCM 175 and memory block 177. Verification agent 170 can monitor the status of OCM 175 and/or memory block 177 to determine if processor 162 and OCM 175 are operating properly after a sleep-wake cycle.

Figure 6:
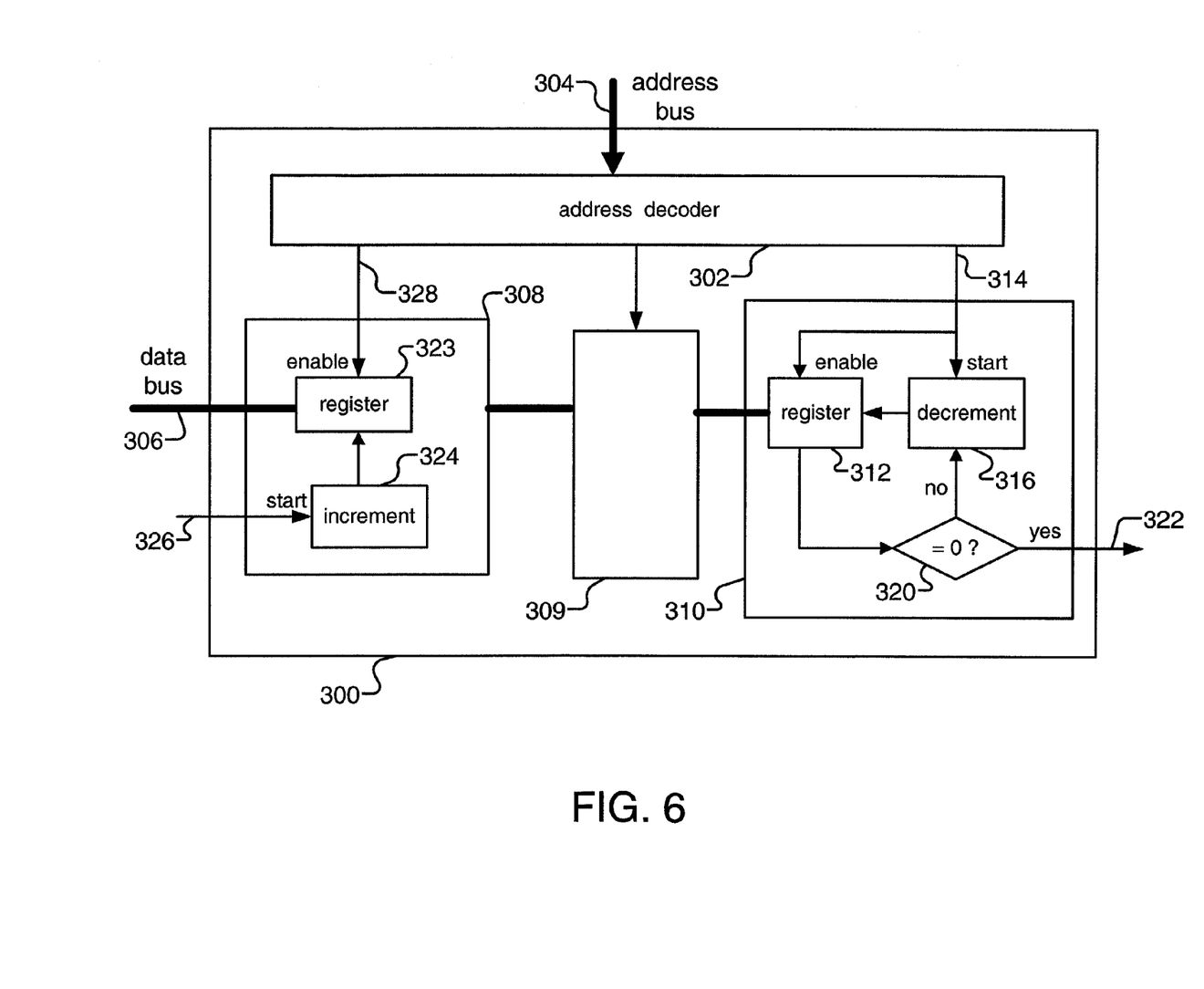
FIG. 6 is a block diagram showing an implementation of a verification agent of the present invention.

An exemplary verification agent 300 that can be used in process 210 is shown in FIG. 6. In contains an address decoder 302 that is connected to an address bus 304. Address bus 304 can be part of bus 165 of system 160 of FIG. 3. Verification agent 300 also accepts data in a data bus 306. Data bus 306 can be part of bus 165 of system 160. Address bus 304 and data bus 306 are accessible by various components in system 160. Agent 300 has a plurality of testing modules (such as modules 308-310) that are used to send signals to and receive signals from various modules under test. Different addresses cause different actions in different testing modules of agent 300. One exemplary testing module, 310, is shown in details here. It contains a register 312. Its "enable" terminal is connected to a line 314 that corresponds to a decoded address. When this line is activated (i.e., when agent 300 receives the corresponding address from address bus 304), register 312 accepts data in data bus 306. Agent 300 also contains a decrementor circuit 316 that decrements register 312. It is triggered into action by applying a signal to a "start" terminal. In this embodiment, this terminal is connected to line 314, although it may also be connected to a separate line that corresponds to another decoded address. The output of register 312 is connected to a zero-detector 320. If the value of register 312 is not equal to zero, detector 320 causes circuit 316 to decrement register 312 on more time. If the value of register 312 is equal to zero, an output signal is generated at a line 322. As a result, agent 300 can generate a timed signal that can be applied to a module under test. The processor can initialize register 312 and set testing module 310 in motion by writing to verification agent 300 at appropriate times.

FIG. 6 shows another exemplary testing module 308. It contains a register 323 and an incrementor circuit 324. In this example, another address causes address decoder 302 to generate an enable signal 328. This signal allows register 323 to capture data in data bus 306. Incrementor circuit 324 is triggered by an external signal, shown as signal 326 that is separate from address bus 304. Signal 326 can be generated by a module under test, processor, or other modules.

Figure 7:
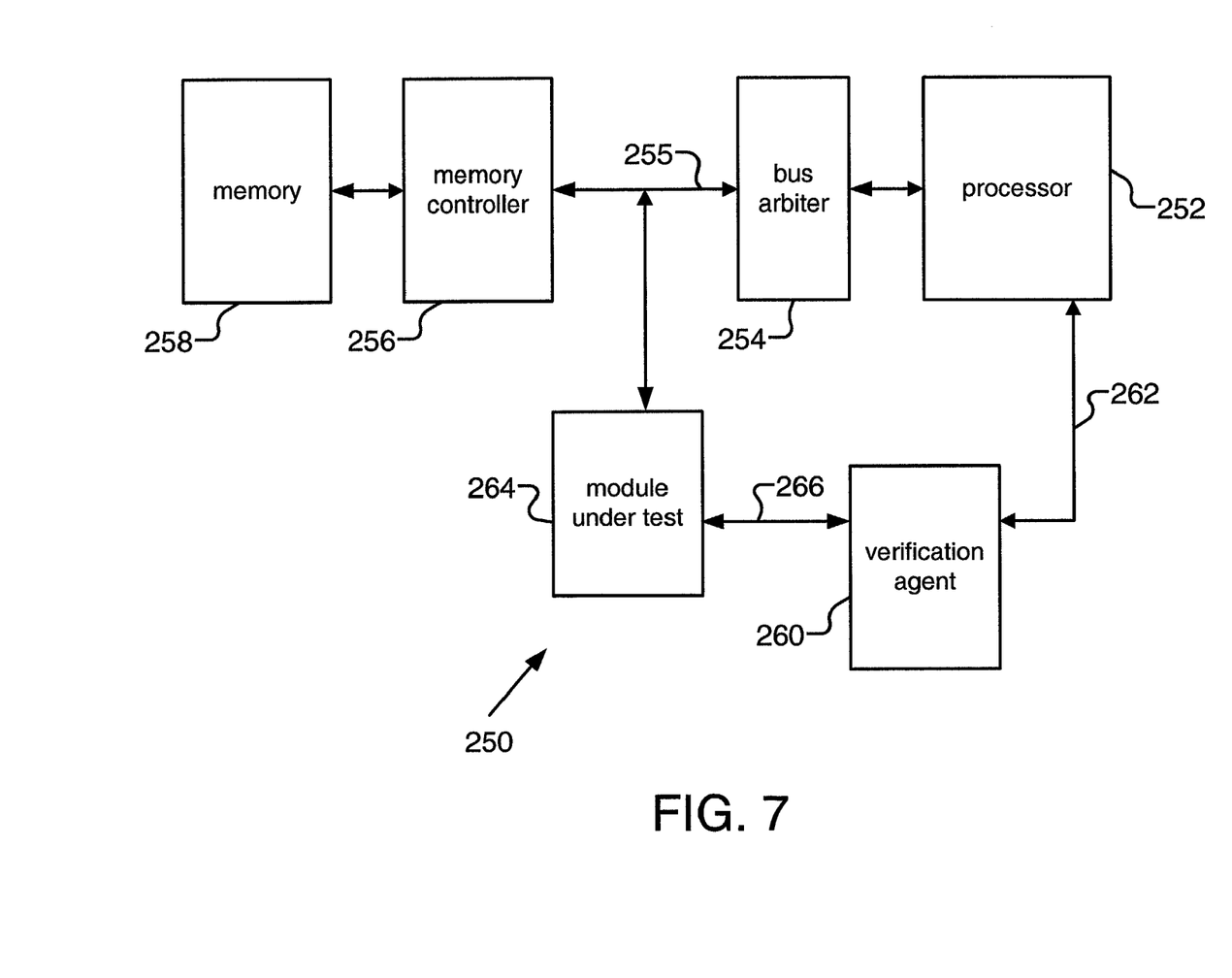
FIG. 7 is a block diagram showing another implementation of a data processing system showing the verification agent of the present invention.

In some situations, it may not be desirable to attach the verification agent on a shared bus. For example, if the test relates to timing on the shared bus, the existence of the verification agent on the shared bus may affect the timing. Some processors allow communication between the processor and external modules using a special bus. For example, this can be achieved through a separate device control bus. An example of such a system 250 is shown in FIG. 7. It comprises a processor 252 connected to a bus arbiter 254. Processor 252 may be connected to OCMs (not shown). One of the modules that is connected to a bus 255 managed by bus arbiter 254 is a soft memory controller 256. Memory controller 256 controls the operation of a block of memory 258. In this embodiment, a verification agent 260 is connected to processor 252 through a separate device control bus 262. A module under test 264 may be connected to bus 255. Verification agent 260 and module under test 264 may communicate directly by passing various signals between them (shown in FIG. 7 as a line 266). As a result, the present of verification agent 260 will not affect the behavior of bus 255 and module under test 264.

Figure 8:
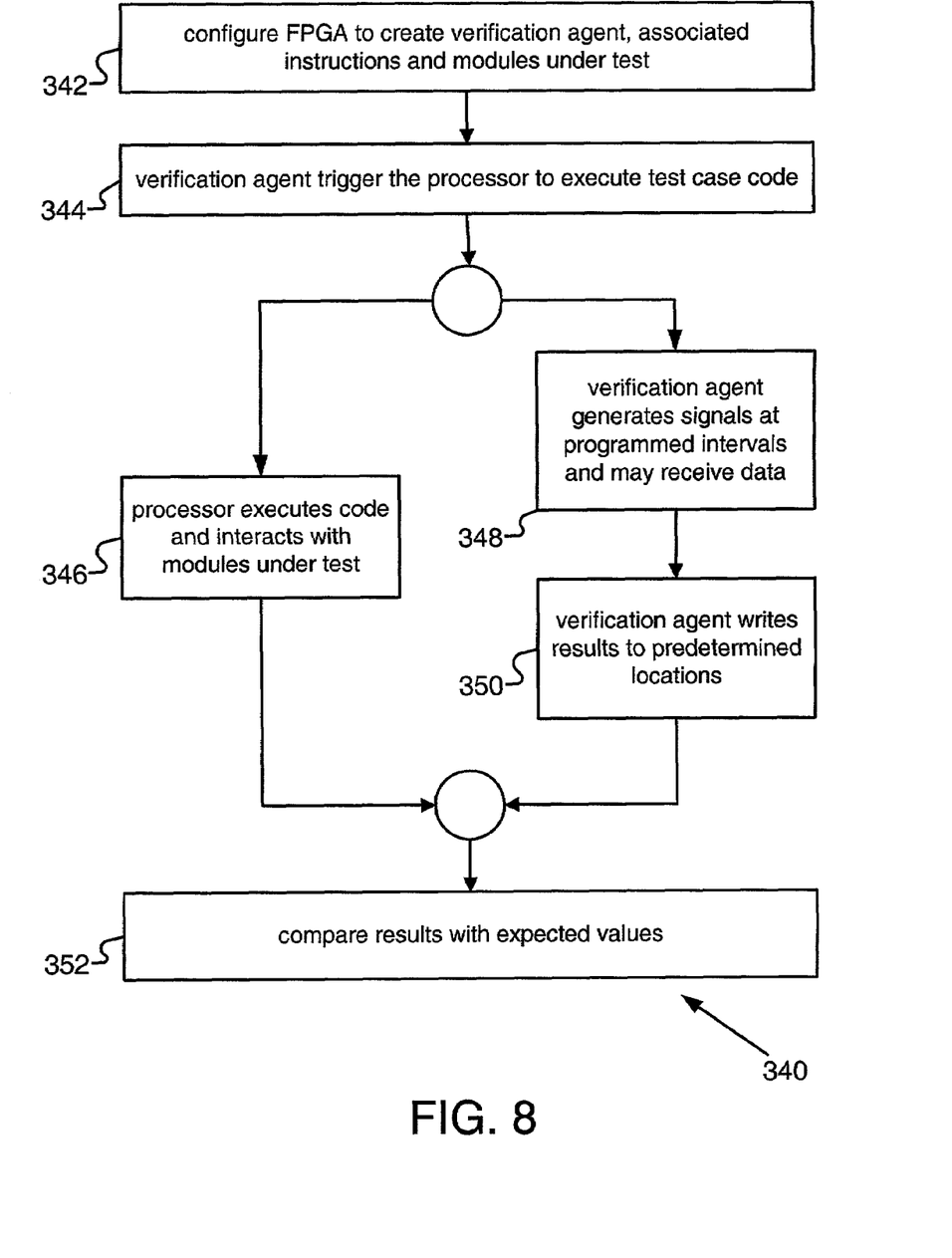
FIG. 8 is a flow chart showing another operation in accordance with the present invention.

In a separate embodiment of the present invention, the verification agent may initiate a test case (as oppose to initiation by a processor). FIG. 8 shows a flow chart of an operation 340 of this embodiment. In step 342, the FGPA is configured to create various modules, including a verification agent and modules under test. A portion of the memory in the FPGA, such as the block random access memory built in many FPGAs, can be configured to store a set of instructions for the verification agent. In step 344, the verification agent executes the instructions, which include triggering the processor to execute codes of a test case. The processor and the verification agent now operate concurrently. In step 346, the processor interacts with the modules under test (which may include initializing the modules). In step 348, the verification agent generates signals at programmed intervals, and sends the signals to the modules under test. The verification agent may also receive data from them. In step 350, the verification agent writes results to predetermined locations. After the testing is completed, the processor compares the actual results with expected results. It can then determine whether the modules under test are operating properly.

It can be seen from the above description that a novel verification apparatus and method have been disclosed. Those having skill in the relevant arts of the invention will now perceive various modifications and additions which may be made as a result of the disclosure herein. Accordingly, all such modifications and additions are deemed to be within the scope of the invention, which is to be limited only by the appended claims and their equivalents.

What is claimed is:

1. An integrated circuit comprising:
a processor;
memory for storing code executable by the processor;
a module under test that performs predetermined operations;
an address bus;
a programmable verification agent that interacts with the module under test, including sending at least one stimulus to the module under test and generating results based on such interaction, wherein the programmable verification agent comprises a plurality of testing modules formed in a programmable logic device and an address decoder for generating at least one control signal in response to an address in the address bus, the at least one control signal being connected to one of the testing modules, wherein at least one of the testing modules generates an output in response to receiving the at least one control signal, the output being used as the at least one stimulus; and
wherein the code causes the processor to initiate the programmable verification agent, receive the results, and compare the results with expected values.

2. The integrated circuit of claim 1 wherein the verification agent is mapped into address space of the processor.

3. The integrated circuit of claim 1 wherein the module under test is initialized by the processor.

4. The integrated circuit of claim 1 wherein the programmable verification agent and module under test are implemented in programmable logic and the processor is implemented in hard logic.

5. The integrated circuit of claim 1 wherein the programmable verification agent is implemented in programmable logic and the module under test is implemented in hard logic.

6. The integrated circuit of claim 5 wherein the module under test is an on-chip memory controller.

7. The integrated circuit of claim 1 wherein the verification agent communicates with the processor through a first bus and the module under test communicates with the processor through a second bus.

8. The integrated circuit of claim 7 wherein the first bus is a device control bus and the second bus is a processor local bus.

9. The integrated circuit of claim 7 wherein the verification agent communicates with the processor through additional signal lines.

10. The integrated circuit of claim 7 wherein the module under test is initialized by the processor.

11. The integrated circuit of claim 7 wherein the programmable verification agent and module under test are implemented in programmable logic and the processor is implemented in hard logic.

12. The integrated circuit of claim 7 wherein the programmable verification agent is implemented in programmable logic and the module under test is implemented in hard logic.

13. The integrated circuit of claim 12 wherein the module under test is an on-chip memory controller.

14. The integrated circuit of claim 1 wherein at least one of the testing modules contains a register that can be enabled by the at least one control signal.

15. A circuit arrangement for testing a module under test, comprising:
   a processor integrated on a semiconductor chip;
   a memory integrated on the chip and coupled to the processor, the memory configured with code executable by the processor;
   a module under test implemented on the chip;
   a field programmable gate array integrated on the chip and configured to implement a verification agent, the verification agent coupled to the module under test, to the processor, and to the memory, and adapted to generate a stimulus signal for input to the module under test; and
   wherein the processor, responsive to execution the code in the memory, initiates the verification agent, receives a result signal from the module under test, and compares the result signal to an expected value.

16. The circuit arrangement of claim 15, wherein the module under test is implemented in the field programmable gate array.

17. The circuit arrangement of claim 15, wherein the module under test is integrated on the chip as application-specific integrated circuitry.

18. The circuit arrangement of claim 15, wherein the module under test is an on-chip memory controller.

19. The circuit arrangement of claim 15, further comprising:
   a first bus implemented in the field programmable gate array and adapted to couple the verification agent to the processor; and
   a second bus implemented in the field programmable gate array and adapted to couple the module under test to the processor.

20. The circuit arrangement of claim 15 wherein the processor and the verification agent are adapted to communicate via a memory map in the memory.

21. A method for testing a module under test, comprising:
   configuring resources of a field programmable gate array integrated on a semiconductor chip with configuration data that implements a verification agent;
   configuring a memory integrated on the chip with program code;
   executing the code by a processor integrated on the chip, and initiating the programmable verification agent by the processor in response to execution of the code;
   applying a stimulus signal from the verification agent to a module under test implemented on the chip;
   generating a result signal by the module under test in response to the stimulus signal; and
   comparing the result signal from the module under test to an expected result value.

22. The method of claim 21, further comprising configuring the field programmable gate array with configuration data that implements the module under test.

23. The method of claim 21, wherein the module under test is integrated on the chip as application-specific integrated circuitry.

24. The method of claim 21, wherein the module under test is an on-chip memory controller.

25. The method of claim 21, further comprising configuring the field programmable gate array with configuration data that implements a first bus and a second bus, the first bus adapted to couple the verification agent to the processor, and the second bus adapted to couple the module under test to the processor.

26. The method of claim 21, further comprising:
   establishing a memory map in the memory by the processor in response to execution of the code; and
   communicating between the processor and the verification agent via the memory map.

27. The method of claim 21, further comprising:
   configuring the field programmable gate array with configuration data that implements a plurality of testing modules and an address decoder;
   providing an address from the processor to the address decoder decoding the address by the address decoder, and enabling one of the plurality of testing modules in response to the address; and
   generating the stimulus signal by the enabled one of the plurality of testing modules.

* * * * *